United States Patent
Hafuka (10) Patent No.: US 8,094,753 B2
(45) Date of Patent: Jan. 10, 2012

(54) DEVICE FOR ESTIMATING SYMBOL TIMING OR FREQUENCY OFFSET WITH RELIABILITY OF DEMODULATED SIGNAL DETERMINED

(75) Inventor: Takamitsu Hafuka, Tokyo (JP)

(73) Assignee: Oki Semiconductor Co., Ltd. (JP)

( * ) Notice: Subject to any disclaimer, the term of this patent is extended or adjusted under 35 U.S.C. 154(b) by 730 days.

(21) Appl. No.: 12/197,437

(22) Filed: Aug. 25, 2008

(65) Prior Publication Data

US 2009/0060108 A1    Mar. 5, 2009

(30) Foreign Application Priority Data

Aug. 27, 2007  (JP) ................ 2007-219755

(51) Int. Cl.
*H04L 27/14* (2006.01)
*H04L 27/06* (2006.01)
*H04J 3/06* (2006.01)

(52) U.S. Cl. ......... 375/324; 375/340; 370/347; 370/350

(58) Field of Classification Search .......... 375/324, 375/326, 340, 344, 224, 225, 227; 348/726, 348/729, 735; 370/337, 347, 350, 442
See application file for complete search history.

(56) References Cited

U.S. PATENT DOCUMENTS

2002/0061077 A1* 5/2002 Ohishi .................. 375/326
2006/0269015 A1* 11/2006 Wang et al. ............ 375/330

FOREIGN PATENT DOCUMENTS

JP       9289499      11/1997

* cited by examiner

*Primary Examiner* — Young T. Tse
(74) *Attorney, Agent, or Firm* — Studebaker & Brackett PC; Donald R. Studebaker (57) ABSTRACT

A PHS mobile phone set is provided with an offset estimation device which estimates an offset of a signal received through digital communication and makes use of the estimated offset as correction information for offset correction. The received signal is corrected in offset by use of the estimated offset and then demodulated. In the offset estimation device, the estimated offset is updated on the basis of the control signal indicating whether or not the demodulated digital signal is reliable.

11 Claims, 6 Drawing Sheets

DEVICE FOR ESTIMATING SYMBOL TIMING OR FREQUENCY OFFSET WITH RELIABILITY OF DEMODULATED SIGNAL DETERMINED

BACKGROUND OF THE INVENTION

1. Field of the Invention

The present invention relates to an offset estimation device, and in particular to an offset estimation device for use in a communication device capable of effectively correcting the symbol timing and frequency offset of received data.

2. Description of the Background Art

The PHS (Personal Handy Phone System) is a typical wireless communication system on the basis of TDMA (Time Division Multiple Access). Demodulators for use in the PHS system are provided with a frequency offset correction circuit. The frequency offset correction circuit makes it possible to accurately demodulate a received signal with its frequency offset removed.

The PHS system uses TDMA/TDD (Time Division Multiple Access/Time Division Duplex). The frame format of TDMA/TDD is of a 5 msec frame length composed of eight time slots each of 0.625 msec long. The first to fourth ones of the time slots are assigned to transmission use and the fifth to eighth time slots to reception use.

For use in communication between a base station, or cell station (CS), and a terminal device, or personal station, (PS) in the PHS system, there are two types of channels, i.e. control channel (CCH) and traffic channel (TCH).

The control channel is for use in performing necessary processes, such as handshaking, synchronization, PS location registration, PS authentication process, in a call connection procedure before actual data transmission and reception between cell and personal stations. On the other hand, the traffic channel is for use in performing actual data transmission and reception between cell and personal stations. The control and traffic channels are used for respective purposes different from each other in this manner. Because of this, the control and traffic channels are also different from each other in configuration of time slots to be transmitted over the respective channels.

As an example of TDMA communication, the communication of a PHS system will be described which is in conformity with ARIB STD-28 (Association of Radio Industries and Businesses Standard-28). A time slot transmitted over a control channel will be referred to as a physical slot for control, and a time slot transmitted over a traffic channel will be referred to as a physical slot for communication. The formats of the physical slot for control and the physical slot for communication in accordance with DQPSK (Differential Quadrature Phase Shift Keying) are defined as follows.

The format of the physical slot for control has its preamble defined longer so as to ensure frequency offset estimation for the purpose of transmitting and receiving control data in advance of actual communication to establish synchronization, for example. Specifically, the physical slot for control is composed of a ramp field of 4 bits, a preamble field of 64 bits, a unique word field of 32 bits, a payload field of 108 bits, a CRC (Cyclic Redundancy Check) field of 16 bits, and a ramp field of 4 bits. By contrast, the physical slot for communication is composed of a ramp field of 4 bits, a preamble field of 8 bits, a unique word field of 16 bits, a payload field of 180 bits, a CRC field of 16 bits, and a ramp field of 4 bits. The physical slot for communication is for use in carrying data to be actually transmitted and received rather than control data, and is therefore provided with a longer payload field. For this purpose also, the preamble field is defined to be shorter.

In the format of the DQPSK modulation scheme, the time slot configuration differs in preamble length between the physical slot for control and the physical slot for communication, thus giving rise to different demodulation schemes used. Since the physical slot for control has its preamble length long, sufficient data can be used for estimating the frequency offset in the demodulation process. Because of this, only with the preamble information of one slot, a highly reliable value can be obtained as an estimated frequency offset, and on the basis of this information the subsequent unique word and information can be correctly demodulated.

If the bit length necessary for accurately estimating a frequency offset is 40 bits, the physical slot for control has the long preamble field of 64 bits which is sufficient for estimating the frequency offset in the demodulation process. It is therefore possible to accurately demodulate the subsequent unique word, payload and CRC data. By this demodulation, it is possible to use information on the frequency offset estimated in respect of the first time slot transmitted in each of the frames.

Contrary to this, since the preamble in the slot of the traffic channel is very short as compared with that of the control channel, mere information on the preamble of one slot cannot render a reliable value as an estimated offset so that the demodulation is not accurate. The demodulation of a traffic channel is therefore performed in such a fashion that the frequency offset estimated in each slot of a traffic channel is applied to correcting the frequency offset in the slots of the traffic channel following thereto. A repetition of this process until correct data are obtained renders the demodulation accurate.

However, when abrupt degradation occurs due to fading or the like in the communication environment during the communication between a cell station and a personal station over a traffic channel, the frequency offset, when estimated on the basis of received signal thus degraded, becomes more likely to be erroneously estimated. In the case of traffic channel, for the correction of the frequency offset in the first slot of the next frame, the frequency offset thus erroneously estimated in the previous frame is used so as to render the estimation in the next slot less reliable. This estimation at the first slot of each frame is repeated, resulting in increasing the possibility of failing to obtain accurately demodulated data.

SUMMARY OF THE INVENTION

It is therefore an object of the present invention to provide an offset estimation device which makes it possible to obtain accurately demodulated data even when the communication environment is so worse that radio waves are received with much noise.

In accordance with the present invention, an offset estimation device is provided to estimate an offset of a signal received through digital communication and make use of the estimated offset as correction information for offset correction, and comprises: an estimator for estimating the correction information with respect to the received signal; a corrector operative in response to the correction information for correcting the offset of the received signal; a demodulator for demodulating the received signal of which the offset is corrected by the corrector; and a determiner for examining the received signal which is demodulated by the demodulator and evaluating the reliability of the demodulated digital signal to output a control signal indicating whether or not the demodulated signal is reliable, the estimator being operative in response to the control signal to update the correction information.

By this configuration, even when the communication environment is degraded during communication, data can be accurately demodulated by use of the estimated offset which is updated on the basis of the control signal indicating whether or not the demodulated digital signal is reliable.

BRIEF DESCRIPTION OF THE DRAWINGS

The objects and features of the present invention will become more apparent from consideration of the following detailed description taken in conjunction with the accompanying drawings in which.

DESCRIPTION OF THE PREFERRED EMBODIMENTS

With reference to the accompanying drawings, an offset estimation device in accordance with preferred embodiments of the present invention will be described in detail.

Figure 1:
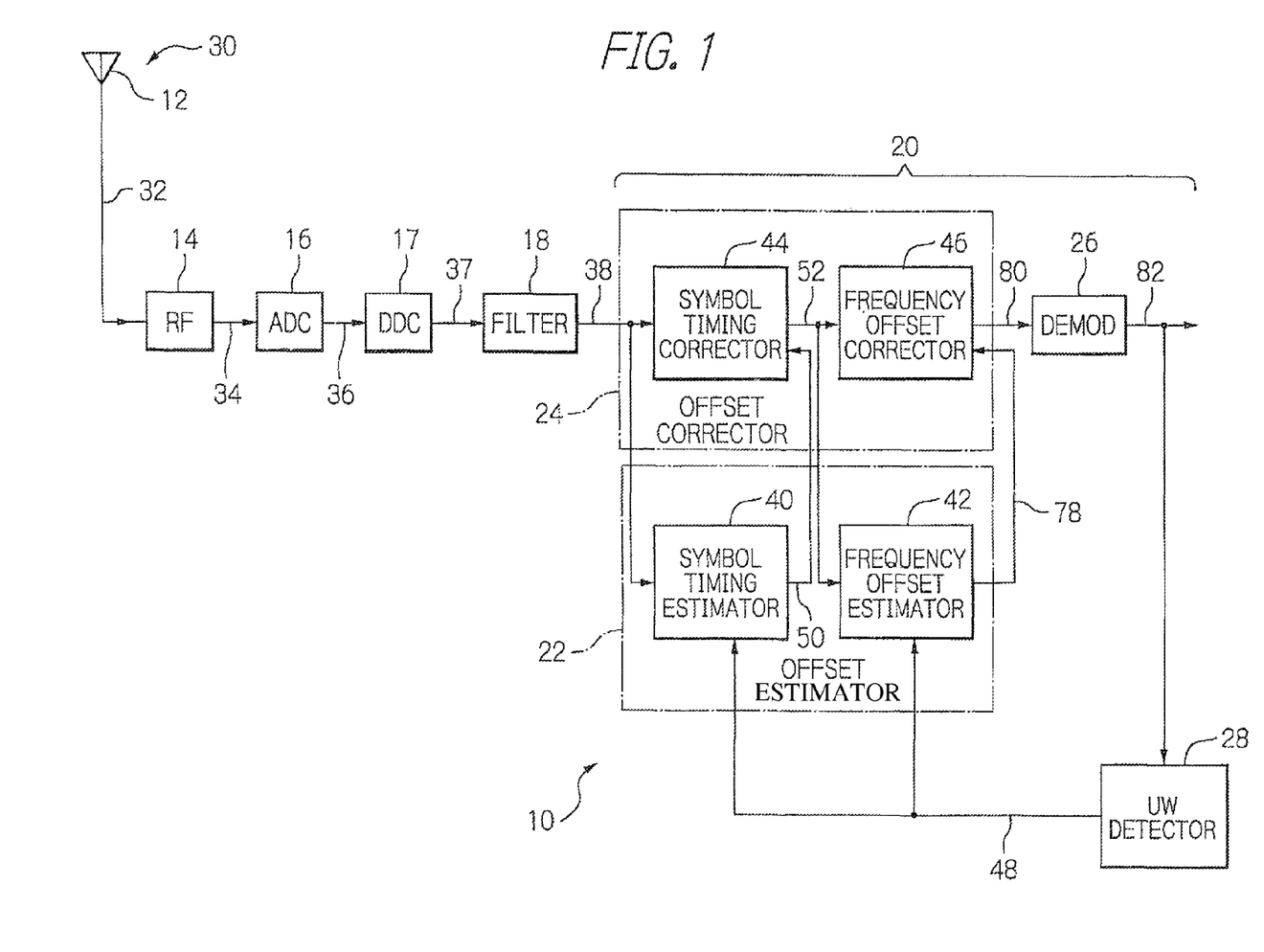
FIG. 1 is a block diagram schematically showing the structure of a preferred embodiment of a demodulator of a PHS mobile phone set equipped with an offset estimation device in accordance with the present invention.

With reference first to FIG. 1, the offset estimation device in accordance with a preferred embodiment of the present invention is implemented within a PHS (Personal Handy Phone System) mobile phone set 10. In the PHS mobile phone set 10, a demodulator circuit (DEMOD) 26 included in a demodulator 20 demodulates a signal 80 received, and a UW (Unique Word) detector 28 determines whether or not a demodulated signal 82 is of its normal condition to produce a resultant UW detection signal 48 to an offset estimator 22, which responds to the UW detection signal 48 to update output data 78 which are frequency offset information estimated with respect to a received signal 52. The PHS mobile phone set 10 may thereby use only an estimated result which is higher in reliability to demodulate data, thus obtaining more accurate demodulated data even when communication environment gets worse during communication. Signals are designated with reference numerals of connections conveying them.

The illustrative embodiment is directed to the PHS mobile phone set 10 to which the offset estimation device is applied in accordance with the invention. The PHS mobile telephone set 10 includes, as shown in FIG. 1, an antenna 12, an RF (Radio Frequency) module 14, an analog-to-digital converter (ADC) 16, a digital down-converter (DDC) 17 and a digital filter 18, in addition to the demodulator 20, which are interconnected as illustrated. The demodulator 20 includes an offset corrector 24 as well as the offset estimator 22, demodulator circuit 26 and UW detector 28, which are interconnected as shown. With respect to components and/or structure which are not directly relevant to understanding the present invention, illustration and description will be dispensed with.

The antenna 12 serves as receiving radio waves transmitted by a cell station and originating from a party under communication to induce a high frequency analog signal 32 corresponding to the radio waves. The high frequency analog signal 32 is received by the RF module 14.

The RF module 14 is provided with the functionality of amplifying the high frequency analog signal 32 received to a predetermined level while suppressing noise. The high frequency analog signal 34 amplified by the RF module 14 is transmitted to the analog-to-digital converter 16.

The analog-to-digital converter 16 is provided with the functionality of converting the analog signal 34 received into a corresponding digital signal 36. More specifically, the analog-to-digital converter 16 samples the analog signal 34 received in synchronization with a clock signal, not shown, and outputs the digital data 36 as sampled to the digital down-converter 17.

The digital down-converter 17 is provided with the functionality of down-converting the digital data 36 by converting the frequency of the digital data 36 to a baseband frequency. The digital data 37 thus down-converted is supplied to the digital filter 18. The digital filter 18 functions as extracting desired frequency band data of the down-converted digital data 37 as a digital data 38 to passes the latter to the demodulator 20. The digital data 38 is input to the offset estimator 22 and offset corrector 24 of the demodulator 20 which are the characteristic components of the present invention.

The demodulator 20 is provided with the functionality of estimating the offset of the digital data 38, correcting the digital data 38 by removing the offset, and demodulating the corrected digital data. The demodulated digital data 82 forms output data of the system and is also delivered to the UW detector 28, which serves to detect the unique word in the demodulated digital data 82, and output a unique word detection signal 48 indicating whether or not the unique word is detected as described below in detail.

The offset estimator 22 includes a symbol timing estimator 40 and a frequency offset estimator 42, and serves to estimate the offsets of the digital data 38 by detecting the unique word.

The offset corrector 24 includes a symbol timing corrector 44 and a frequency offset corrector 46, and serves to correct the digital data 38 on the basis of the estimated offsets. From another view point, the symbol timing estimator 40 and the symbol timing corrector 44 can be considered as a symbol timing adjuster. Similarly, the frequency offset estimator 42 and the frequency offset corrector 46 can be considered as a frequency offset adjuster. The symbol timing estimator 40 serves to estimate the timing misalignment of symbols on the basis of the detection of a unique word.

The symbol timing is defined as the timing in synchronization with which a personal station (PS) determines a binary value of "0" or "1" in the received signal transmitted from a cell station (CS) or a signal produced by detecting the received signal with respect to a predetermined reference level. The symbol timing estimator 40 outputs, to the symbol timing corrector 44, data 50 indicative of a symbol timing offset (mismatch) 50 which is estimated with reference to the unique word detection signal 48.

The symbol timing corrector 44 is provided with the functionality of correcting the digital data 38 in accordance with the estimated symbol timing offset 50. The digital data 38 which is corrected by the symbol timing corrector 44 is then supplied to the frequency offset estimator 42 and the frequency offset corrector 46.

The frequency offset estimator 42 is provided with the function of estimating the frequency offset of the digital data 52 on the basis of detection of the unique word. The frequency offset is defined, when viewing a base station, i.e. cell station (CS), from a mobile station, i.e. personal station (PS), as the amount of displacement in frequency of a signal transmitted from the base station in timed with the master clock of the base station, i.e. a signal received by the mobile station with respect to the master clock of the mobile station. In other words, the frequency offset indicates a difference in frequency of the master clock between the base station (CS) and the mobile station (PS).

Figure 2:
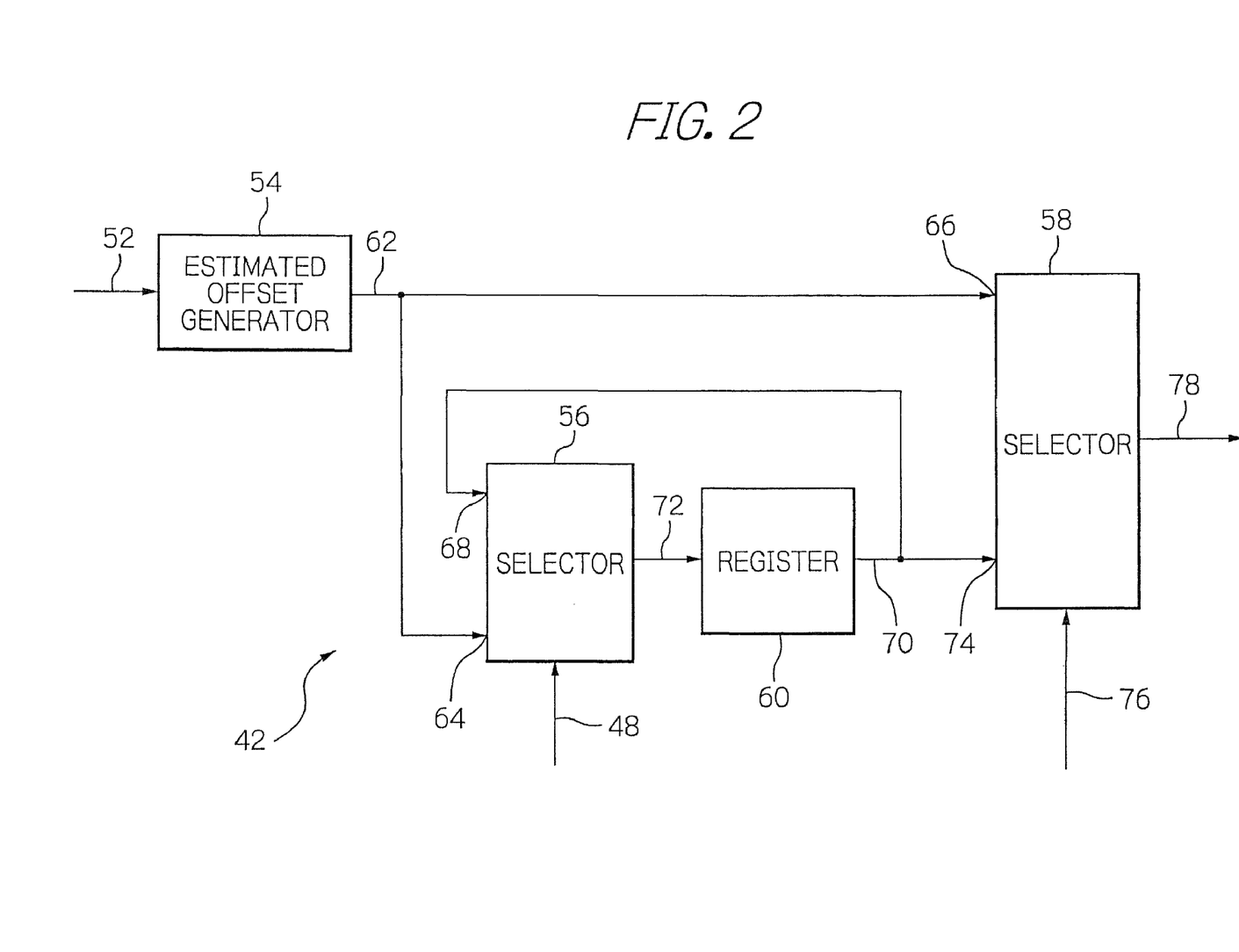
FIG. 2 schematically shows an exemplary structure of a frequency offset estimator shown in FIG. 1.

An exemplary structure of the frequency offset estimator 42 is shown in FIG. 2. The frequency offset estimator 42 includes an estimated offset generator 54, selectors 56 and 58, and a register 60, which are interconnected as illustrated.

The estimated offset generator 54 is provided with the functionality of generating estimated offset data 62 for use in correcting the frequency on the basis of the digital data 52 supplied. The estimated offset data 62 generated by the estimated offset generator 54 is then supplied to one input terminal 64 of the selector 56 and one input terminal 66 of the selector 58.

The selector 56 is adapted for selecting and outputting one of the input signals in accordance with the detection of the unique word. The selector 56 has its one input terminal 64 for receiving the estimated offset data 62 generated by the estimated offset generator 54 and its other input terminal 68 for receiving the data 70 output from the register 60. Namely, if the selector 56 receives the unique word detection signal 48 (for example, raised to its positive level) indicating that the unique word is detected during data reception, then it outputs the estimated offset data 62 as the output data 72. Otherwise, for example, if the selector 56 receives the unique word detection signal 48 (for example, pulled down to its negative level) indicating that the unique word is not detected during data reception, then the selector 56 outputs the output data 72 received from the register 60 as the output data 70.

The register 60 is adapted to temporarily store the output data 72 and output it to the selectors 58 and 56. Although not shown in the figure, the register 60 is configured to latch (i.e. store and output) the output data 72 in synchronization with a clock signal, which is supplied to the register 60 from the system, after the unique word detection signal 48 is input to the selector 56. The register 60 outputs the output data 70 to the other input terminal 74 of the selector 58 and one input terminal 64 of the selector 56.

The other selector 58 is provided with the functionality of being operative in response to a selection signal 76 which indicates which of the control/traffic channels is used to select either one of the estimated offset data 62 received from the estimated offset generator 54 on its one input terminal 66 and the output data 70 received from the register 60 on its other terminal 74. The selector 58 outputs the output data 78 to the frequency offset corrector 46 in response to the selection signal 76. Specifically, the selector 58 selects the estimated offset data 62 as the output data 78 in response to the selection signal 76 indicative of the reception over the control channel, and selects the output data 70 as the output data 78 in response to the selection signal 76 indicative of the reception over the traffic channel.

Returning to FIG. 1, the frequency offset estimator 42 supplies the frequency offset corrector 46 with the output data 78, which indicates the frequency offset estimated on the basis of the detection of the unique word. The frequency offset corrector 46 is provided with the functionality of correcting the frequency offset of the input data 52 with reference to the output data 78 transmitted from the frequency offset estimator 42. The data 80 corrected by the frequency offset corrector 46 is output to the demodulator circuit 26.

The demodulator circuit 26 is provided with the functionality of demodulating the data which is corrected with respect to the symbol timing and frequency offset. The data 80 corrected is output from the demodulator circuit 26 to the subsequent stage and the UW detector 28.

The UW detector 28 is provided with the functionality of detecting the unique word contained in a single time slot. Although not shown in the figure, the UW detector 28 includes a correlator and a comparator.

The correlator serves to generate a correlation value indicative of how closely the corrected data 82 is correlated with a predetermined pattern. The comparator serves to compare the correlation value obtained by the correlator with a predetermined threshold, and determine that the unique word is detected if the correlation value is higher than the predetermined threshold. As the unique word detection signal 48, the UW detector 28 outputs a level "1" signal if the unique word is detected and a level "0" signal if the unique word is not detected.

As has been discussed above, the offset estimator 22 updates the estimated symbol timing offset 50 and the estimated frequency offset 78 on the basis of the detection of the unique word. The unique word is thus not detected unless the estimation result is correct, and thereby the detection of the unique word can be used to indicate whether or not the estimation result is correct.

In what follows, the operation of the frequency offset estimator 42 will be briefly described. When the communication environment is good so that the PHS mobile phone set 10 receives radio waves with less noise, the UW detector 28 can correctly detect the unique word. If the unique word is correctly detected, the frequency offset estimator 42 determines that the symbol timing and frequency offset estimated in advance of detecting the unique word are reliable and can be used for correction of the digital data 38.

By contrast, when the communication environment is not good so that the PHS mobile phone set 10 receives radio waves with much noise, the UW detector 28 cannot detect the unique word. If the unique word is not detected, the frequency offset estimator 42 determines that the symbol timing and frequency offset estimated in advance of detecting the unique word are not reliable and cannot be used for correction of the digital data 38 in the next slot. In this case, the frequency offset estimator 42 does not update the symbol timing and frequency offset, but makes use of the latest symbol timing and frequency offset which have been correctly estimated.

The frequency offset is estimated in each of the physical slots T0 to T3 transmitted from the cell station CS and received by the personal station PS in each TDMA/TDD frame. For the frequency offset in each physical slot of the first TDMA/TDD frame (1) transmitted over each traffic channel, the frequency offset and symbol timing offset are corrected by use of the estimated offsets of the corresponding physical slot of the last TDMA/TDD frame (n) transmitted over the control channel. In this case, however, the preamble in the slot of the traffic channel TCH is very short as described above. It means that the bits available in offset estimation are fewer.

If the information of the preamble field were used alone in the physical slot of the traffic channel TCH in the same manner as in a physical slot of the control channel CCH, then the reliability of the estimated offsets would become lower. If use is made of the information in the unique word field and the payload field located subsequent to the preamble field, then the amount of information available for estimation increases, thus the reliability of the frequency offset and symbol timing offset being improved.

If, after estimating the frequency offset and symbol timing offset in this manner, the frequency offset and symbol timing offset of the physical slot of the traffic channel TCH were corrected with reference to the estimated offsets in the same manner as in the physical slot of the control channel CCH followed by demodulating the corrected data, then the demodulation would be started in the middle of the payload field skipping part of the payload data that is used for estimating the offsets. Since the personal station PS successively would thus receive the data transmitted from the cell station CS, the unique word field and part of the payload field used in estimation would remain without being demodulated.

The demodulation of such information could be performed by providing a register for saving and demodulating the information. However, a large extra area would be required in the circuit layout because this register must be high in capacity. Because of this, with the illustrative embodiment, the frequency offset and symbol timing offset in the physical slot of the traffic channel TCH in a TDMA/TDD frame are corrected by use of the frequency offset and symbol timing offset estimated in the physical slot of the traffic channel TCH in the previous TDMA/TDD frame.

Figure 3:
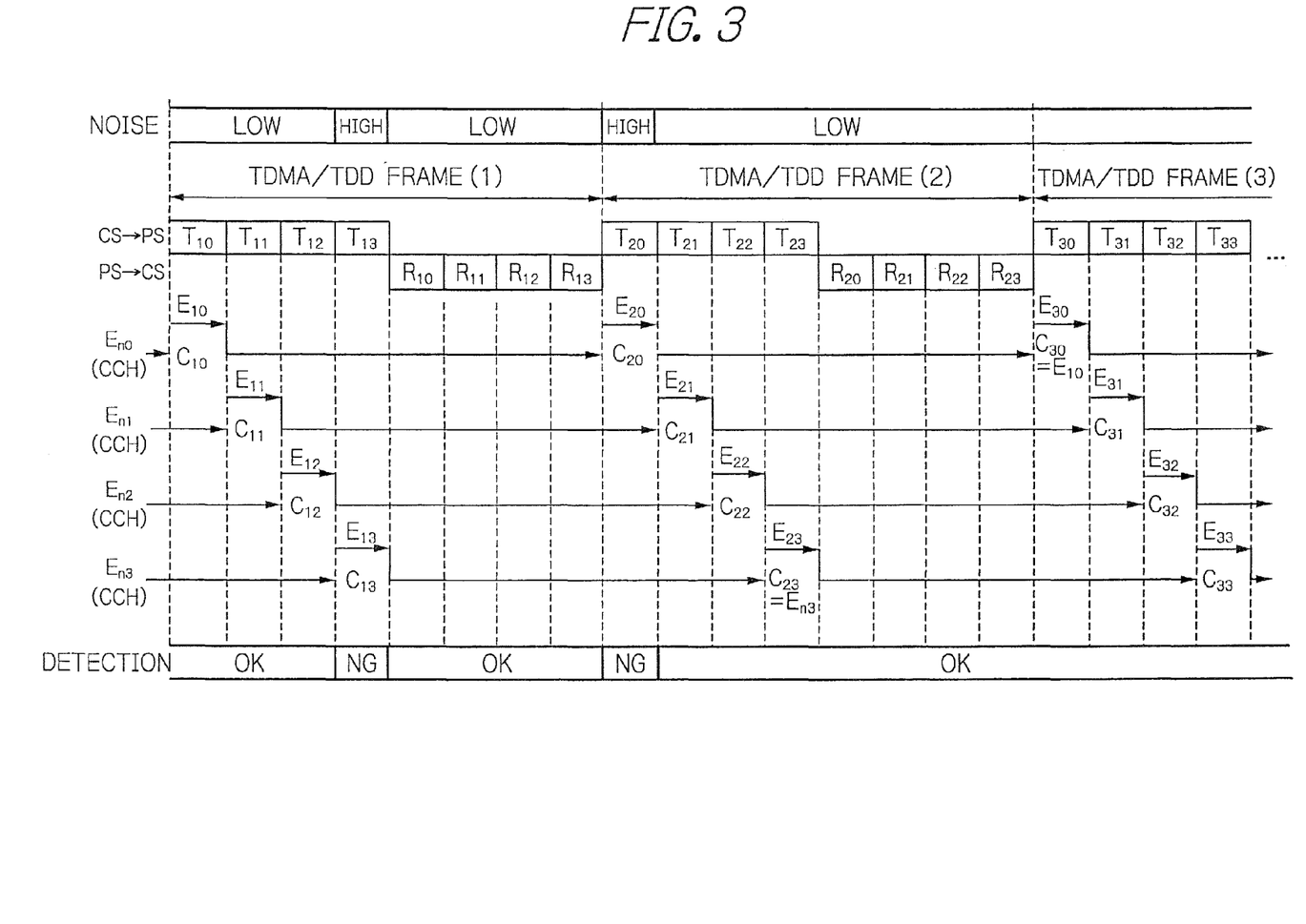
FIG. 3 is a time chart showing the relationship between the frequency offset estimated in each slot and the frequency offset for use in correcting the frequency offset in the case of the demodulator shown in FIG. 1.

FIG. 3 shows the relationship between the frequency offset estimated in each slot and the frequency offset for use in correcting the frequency offset. In the figure and the following description, the x-th TDMA/TDD frame (x=1, 2, 3, . . . and n) is written as the TDMA/TDD frame (x), the y-th traffic channel (y=0, 1, 2 and 3) is written as the traffic channel (y), and the physical slot of the x-th TDMA/TDD frame transmitted over the traffic channel (y) is written as the physical slot $T_{xy}$.

Generally, the frequency offset in the physical slot $T_{(x+1)y}$ of the traffic channel (y) in the TDMA/TDD frame (x+1) is corrected by use of the estimated offsets in the previous frame, i.e. the frequency offset in the physical slot $T_{xy}$ of the traffic channel (y) in the TDMA/TDD frame (x). However, the frequency offset in the physical slot $T_{1y}$ of the traffic channel (y) in the TDMA/TDD frame (1) is corrected by use of the frequency offset in the physical slot $T_{ny}$ of the traffic channel (y) in the previous TDMA/TDD frame (n).

The variable $E_{xy}$ is the estimated value of the frequency offset in the physical slot $T_{xy}$ of the traffic channel (y) in the TDMA/TDD frame (x). The variable $C_{xy}$ indicates the estimated frequency offset which is used in correcting the frequency offset in the physical slot $T_{xy}$ of the traffic channel (y) in the TDMA/TDD frame (x).

In the physical slot $T_{(x+1)y}$ of the traffic channel (y) in the TDMA/TDD frame (x+1), the estimated frequency offset $E_{(x+1)y}$ of the frame (x+1) is obtained by use of the preamble field, the unique word field and part of the payload field. In parallel with the estimation, the PHS mobile phone set 10 performs demodulation of the data of which the frequency offset is corrected in the physical slot $T_{(x+1)y}$ of the traffic channel (y).

If the demodulation thus performed causes the UW detector 28 to detect the unique word in the TDMA/TDD frame (x+1) demodulated in which the frequency offset $E_{(x+1)y}$ is estimated, it is then determined that the estimated frequency offset $E_{(x+1)y}$ is reliable and used as the estimated frequency offset $C_{(x+2)y}$ for use in correcting the frequency offset in the physical slot $T_{(x+2)y}$ of the traffic channel (y) in the TDMA/TDD frame (x+2).

The frequency offset in the physical slot $T_{(x+2)y}$ of the traffic channel (y) in the TDMA/TDD frame (x+2) is corrected by use of the offset estimated in the physical slot $T_{(x+1)y}$ of the traffic channel (y) in the TDMA/TDD frame (x+1), and then the estimated frequency offset $E_{(x+2)y}$ of the TDMA/TDD frame (x+2) is obtained by use of the preamble field, the unique word field and part of the payload field in the physical slot $T_{(x+2)y}$ of the traffic channel (y) in the TDMA/TDD frame (x+2) in the same manner as described above.

If the UW detector 28 cannot detect the unique word in the TDMA/TDD frame (x+1), it is then determined that the estimated frequency offset $E_{(x+1)y}$ is less in reliability. In this case, the frequency offset in the physical slot $T_{(x+2)y}$ of the traffic channel (y) in the TDMA/TDD frame (x+2) is corrected by use of the offset $E_{xy}$ estimated in the physical slot $T_{xy}$ of the traffic channel (y) in the TDMA/TDD frame (x).

Namely, in the TDMA/TDD frame (x+1) and TDMA/TDD frame (x+2), the frequency offset is corrected by use of the offset $E_{xy}$ estimated in the physical slot $T_{xy}$ of the traffic channel (y) in the TDMA/TDD frame (x). In the TDMA/TDD frame (x+2), after correcting the frequency offset by use of the offset $E_{xy}$ estimated in the TDMA/TDD frame (x), the estimated frequency offset $E_{(x+2)y}$ of the TDMA/TDD frame (x+2) is obtained by use of the preamble field, the unique word field and part of the payload field in the physical slot $T_{(x+2)y}$ of the traffic channel (y) in the TDMA/TDD frame (x+2) in the same manner as described above.

Specifically, referring to FIG. 3, when the unique word is not detected (unique word detection failure: NG) in the physical slot $T_{20}$ of the traffic channel (0) in the TDMA/TDD frame (2), the frequency offset in the physical slot $T_{30}$ of the traffic channel (0) in the TDMA/TDD frame (3) is corrected by use of the offset $E_{10}$ estimated in the physical slot $T_{10}$ of the traffic channel (0) in the TDMA/TDD frame (1). Also, when the unique word is not detected (NG) in the physical slot $T_{13}$ of the traffic channel (3) in the TDMA/TDD frame (1), the frequency offset in the physical slot $T_{23}$ of the traffic channel (3) in the TDMA/TDD frame (2) is corrected by use of the estimated offset $C_{32}$ which is the offset $E_{n3}$ estimated in the physical slot $T_{n3}$ of the traffic channel (3) in the TDMA/TDD frame (n).

As has been discussed above, by updating the estimated frequency offset in accordance with the result of detecting the unique word, it is possible to demodulate data only by use of reliable estimation results. By this configuration, even when the communication environment is degraded during communication, data can be accurately demodulated.

The present embodiment is directed to the case where the present invention is applied to the frequency offset estimator 42. However, the present invention is not limited thereto, but can be applied also to the symbol timing estimator 40.

Next, the differences of the present embodiment over a conventional system disclosed by Japanese patent laid-open publication No. 289499/1997 will be described. This publication discloses the technique of detecting the unique word in the burst data of each TDMA frame, calculating the difference between a count in a frame counter corresponding to the position where the unique word is to be located and a count corresponding to the position of the actually detected unique word, and adjusting the counter value after closing a detection window, i.e. an aperture gate. When the unique word is detected in a TDMA frame, the frame counter is set to the predetermined count value corresponding to the position where the unique word is to be located in the TDMA frame.

However, although the '499 Japanese publication merely discloses the technique of controlling the offset of the timing by transmitting and receiving each TDMA frame in a personal station by use of the detection result of the unique word, it is silent about the technique of estimating, by use of the detection result of the unique word and the result of CRC calculation, the frequency offset and symbol timing offset of a physical slot for communication received by a personal station in each TDMA frame. Also, in this publication, there is no suggestion about the technique of making use of the frequency offset estimated in a TDMA flame for correcting the frequency offset in the subsequent TDMA flame.

Next, the offset estimation device in accordance with an alternative embodiment of the present invention as applied to the PHS mobile phone set 10 will be described. In accordance with the PHS system, a plurality of modulation schemes can be defined in the slot format of the traffic channel TCH.

Figure 4A:
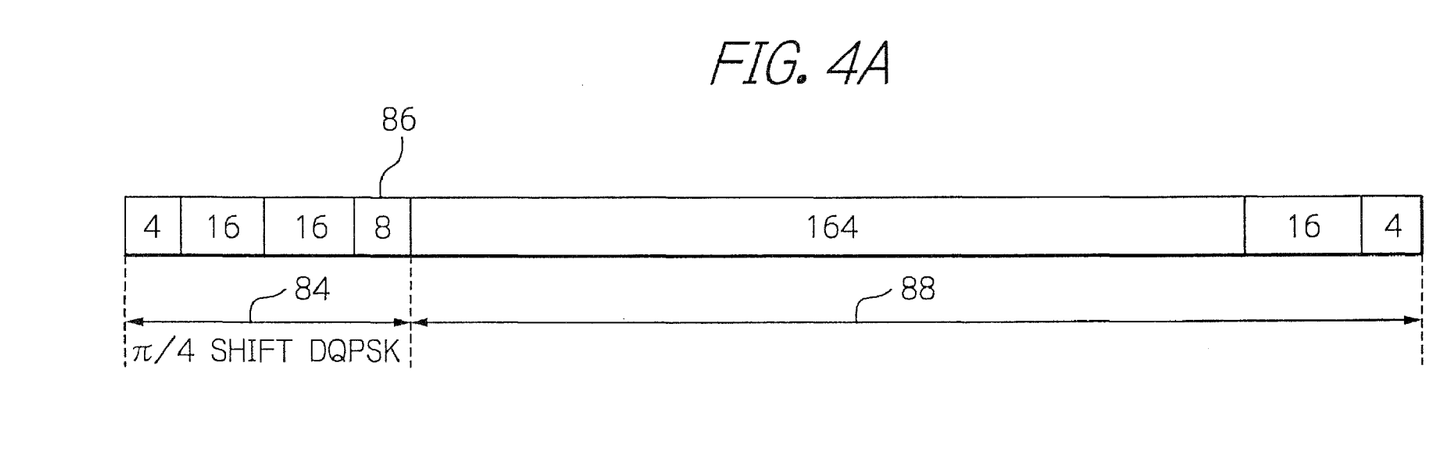
FIGS. 4A and 4B schematically show slot formats making use of $\pi/4$ shift DQPSK and 64-QAM (Quadrature Amplitude Modulation), respectively.
Figure 4B:
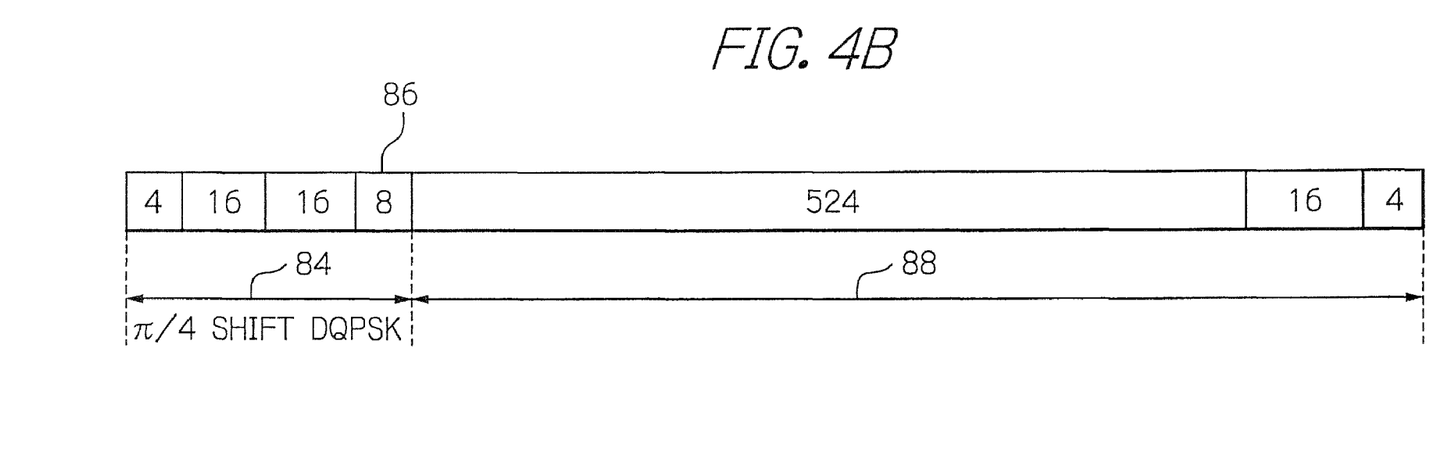

FIGS. 4A and 4B schematically show slot formats making use of π/4 shift DQPSK and 64-QAM (Quadrature Amplitude Modulation). Specifically, each of the slot formats includes a ramp field of 4 bits, a preamble field of 16 bits, a unique word field of 16 bits, an MI (Modulation Information) field of 8 bits. These formats commonly utilize a unique word having the same bit length and the same pattern.

However, the data area 88 subsequent to the MI field differs between these slot formats. In the slot format shown in FIG. 4A, the data area 88 includes a payload field of 164 bits, a CRC field of 16 bits and a ramp field of 4 bits. These fields are modulated in the π/4 shift DQPSK. On the other hand, in the slot format shown in FIG. 4B, the data area 88 includes a payload field of 524 bits, a CRC field of 16 bits and a ramp field of 4 bits. These fields are modulated in the 64-QAM.

In the alternative embodiment, since these slot formats differ in the modulation scheme employed in the data area 88 subsequent to the MI field, the frequency offset estimation is performed by different methods. With respect to the unique word detection, for example, while the modulation scheme is set to π/4 shift DQPSK on the personal station PS side and physical slots for communication are transmitted and received between the cell station CS and the personal station PS in accordance with π/4 shift DQPSK, a slot modulated by 64-QAM transmitted in a clap allows the unique word to be detected because π/4 shift DQPSK is commonly used in the unique word field and the preceding fields thereof.

Because of this, if the system were configured so as to determine the update of the estimated frequency offset in accordance with the detection of the unique word, then the estimated frequency offset would be updated even when receiving a slot modulated by the modulation scheme which is different from that used on the personal station PS side. For example, when the PHS mobile phone set 10 receives a slot modulated by π/4 shift DQPSK, a slot modulated by 64-QAM, and a slot modulated by π/4 shift DQPSK in this order, the frequency offset would be estimated from the 64-QAM slot on the basis of the process of estimating the frequency offset for π/4 shift DQPSK to produce erroneous estimation information, the unique word being detected. This estimated frequency offset would inappropriately be used for estimating the frequency offset in the next π/4 shift DQPSK slot because of the unique word thus detected in the 64-QAM slot. The demodulation might fail because of the inappropriate estimated frequency offset.

Taking this shortcoming into consideration, the present alternative embodiment is structured so that the computation of CRC data which is contained in the data modulated by either modulation scheme is used to determine whether or not the estimated information is to be updated. By this configuration, the estimated frequency offset is not updated when receiving a slot modulated by the modulation scheme which is different from that used on the reception side, so that it is possible to accurately demodulate data in the next frame.

Next, it is assumed that the personal station PS successively receives, over a traffic channel, a first physical slot modulated by DQPSK, a second physical slot modulated by DQPSK and a third physical slot modulated by DQPSK. In this case, if error exists in the data of the payload field of the second physical slot, then the frequency offset estimated in the first physical slot is used to correct the frequency offset not only in the second physical slot but also in the third physical slot.

Figure 5:
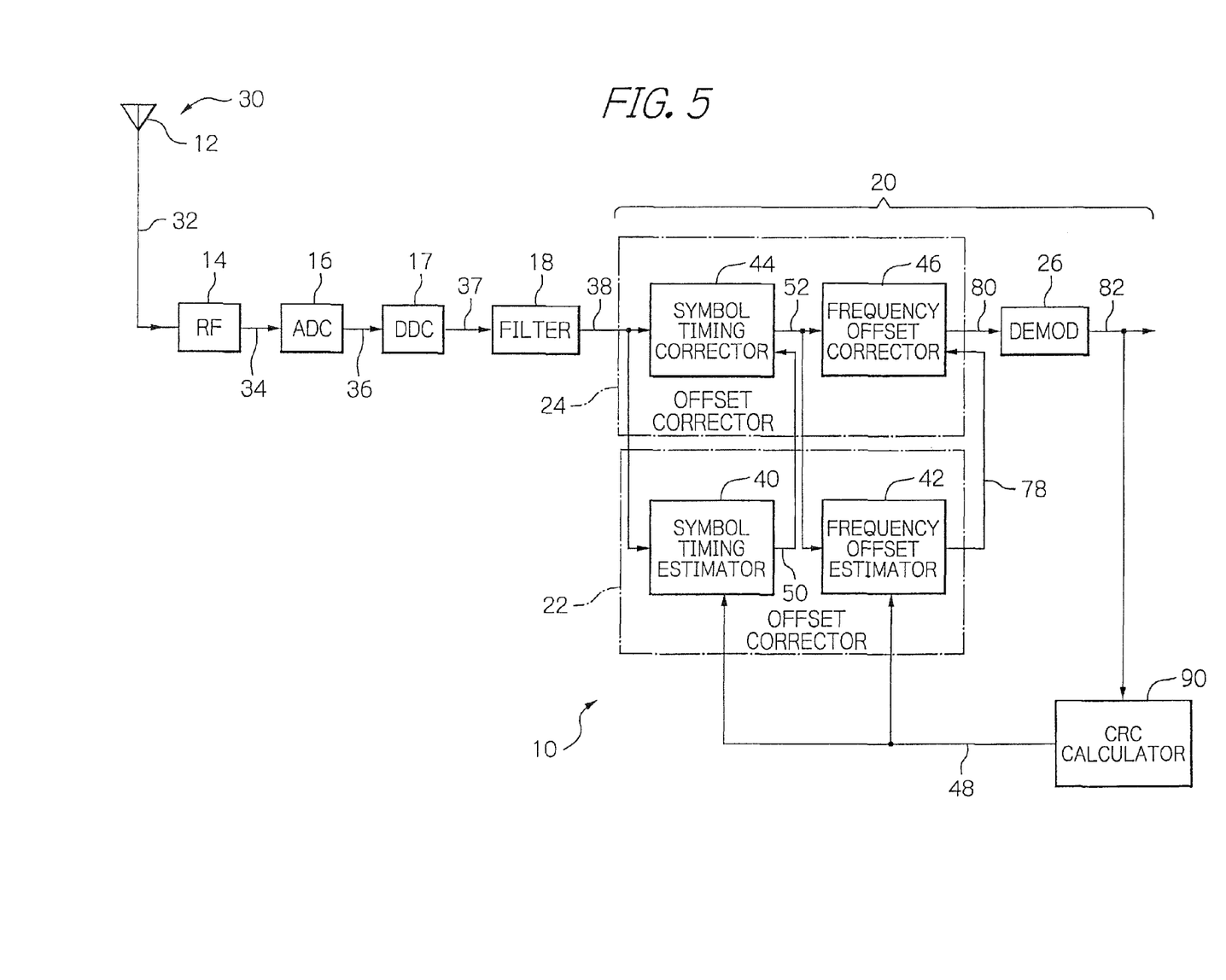
FIG. 5 is a schematic block diagram, like FIG. 1, showing an alternative embodiment of a demodulator a PHS mobile phone set provided with an offset estimation device in accordance with the present invention.

FIG. 5 is a schematic block diagram showing the PHS mobile phone set 10 provided with the offset estimation device in accordance with the present alternative embodiment. This PHS mobile phone set 10 is the same in structure as the PHS illustrated in FIG. 1 except that the UW detector 28 is replaced by a CRC calculator 90. Like components or parts are designated with the same reference numerals. The CRC calculator 90 serves to detect a CRC error in the data of the payload field of each physical slot and output a CRC match signal 48 representative of the result from the CRC checking. The CRC checking can be used as a checksum to detect accidental alteration of data during transmission and so forth.

Accordingly, if it is estimated from the data including an information area in which no error is detected, then the estimated frequency offset can be considered as reliable information. This estimated frequency offset can be considered as effective information to update the estimated frequency offset.

The operation of the demodulator 20 in accordance with the present alternative embodiment will be described with reference to FIG. 6 which shows the relationship between the frequency offset estimated in each slot and the frequency offset for use in correcting the frequency offset. In the figure and the following description, the same indices x and y are used in the same manner as in FIG. 3. In the physical slot $T_{(x+1)y}$ of the traffic channel (y) in the TDMA/TDD frame (x+1), the estimated frequency offset $E_{(x+1)y}$ of the frame (x+1) is obtained by use of the preamble field, the unique word field and part of the payload field. At the same time, the PHS mobile phone set 10 performs demodulation of the data of which the frequency offset is corrected in the physical slot $T_{(x+1)y}$ of the traffic channel (y).

If the CRC calculator 90 detects no error (No) in the data area 88 of the payload field by calculating CRC in the TDMA/TDD frame (x+1) demodulated in which the frequency offset $E_{(x+1)y}$ is estimated, it is then determined that the estimated frequency offset $E_{(x+1)y}$ is reliable and used as the estimated frequency offset $C_{(x+2)y}$ for use in correcting the frequency offset in the next physical slot $T_{(x+2)y}$ of the traffic channel (y) in the TDMA/TDD frame (x+2).

The frequency offset in the physical slot $T_{(x+2)y}$ of the traffic channel (y) in the TDMA/TDD frame (x+2) is corrected by use of the offset estimated in the physical slot $T_{(x+1)y}$ of the traffic channel (y) in the TDMA/TDD frame (x+1), and then the estimated frequency offset $E_{(x+2)y}$ of the TDMA/TDD frame (x+2) is obtained by use of the preamble field, the unique word field and part of the payload field in the physical slot $T_{(x+2)y}$ of the traffic channel (y) in the TDMA/TDD frame (x+2) in the same manner as described above.

If the CRC detector 90 detects error in the data area 88 of the payload field by calculating CRC in the TDMA/TDD frame (x+1), it is then determined that the estimated frequency offset $E_{(x+1)y}$ is not reliable. In this case, the frequency offset in the physical slot $T_{(x+2)y}$ of the traffic channel (y) in the TDMA/TDD frame (x+2) is corrected by use of the offset $E_{xy}$ estimated in the physical slot $T_{xy}$ of the traffic channel (y) in the TDMA/TDD frame (x). More specifically, in both the TDMA/TDD frame (x+1) and TDMA/TDD frame (x+2), the frequency offset is corrected by use of the offset $E_{xy}$ estimated in the physical slot $T_{xy}$ of the traffic channel (y) in the TDMA/TDD frame (x). In the TDMA/TDD frame (x+2), after correcting the frequency offset by use of the offset $E_{xy}$ estimated in the TDMA/TDD frame (x), the estimated frequency offset $E_{(x+2)y}$ of the TDMA/TDD frame (x+2) is obtained by use of the preamble field, the unique word field and part of the payload field in the physical slot $T_{(x+2)y}$ of the traffic channel (y) in the TDMA/TDD frame (x+2) in the same manner as described above.

Incidentally, the frequency offset estimator 42 illustrated in FIG. 2 can be used also in the instant alternative embodiment while the CRC match signal 48 is input to the selector 56 in place of the unique word detection signal 48.

Figure 6:
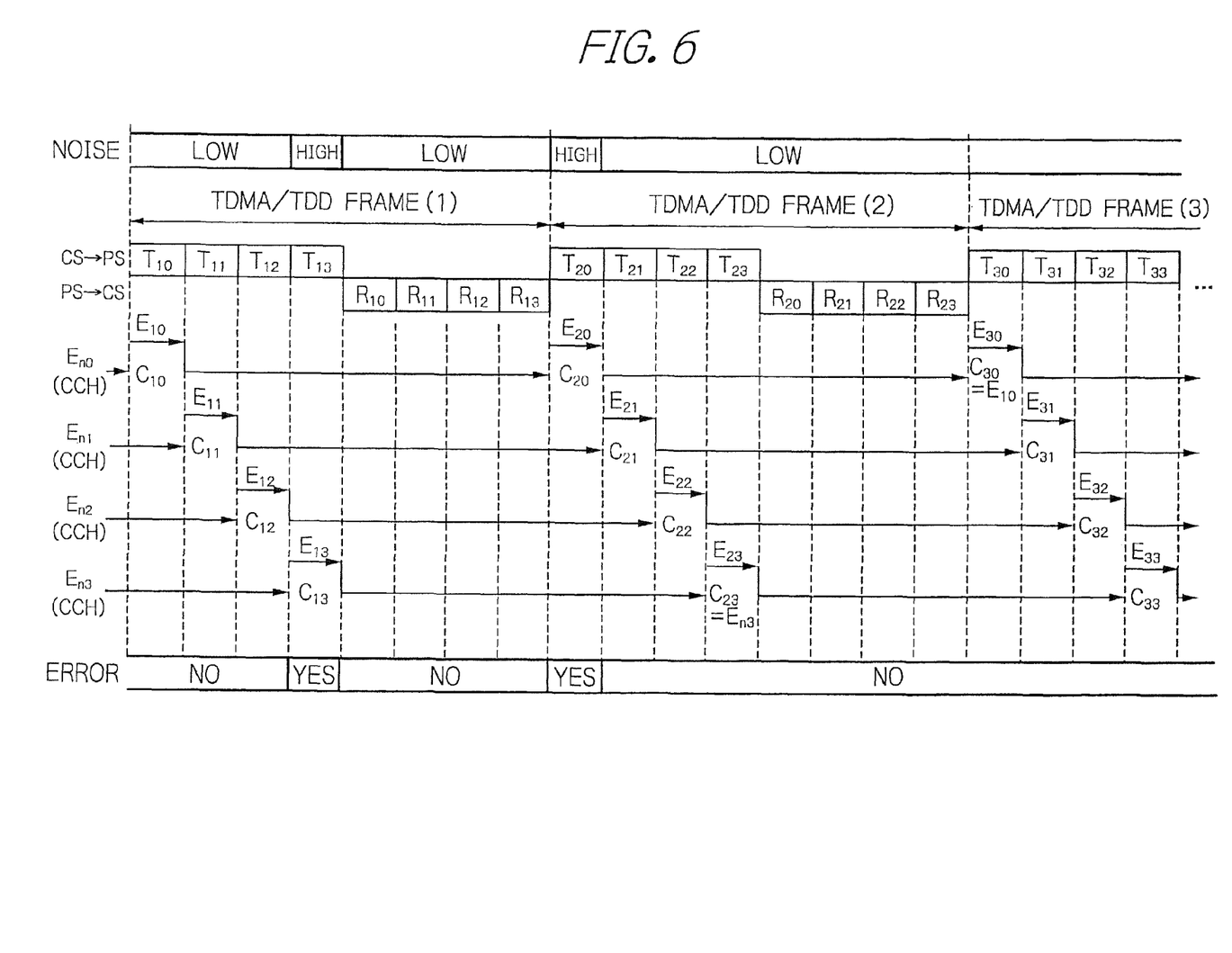
FIG. 6 shows, like FIG. 3, the relationship between the frequency offset estimated in each slot and the frequency offset for use in correcting the frequency offset in the case of the alternative demodulator shown in FIG. 5.

Specifically, referring to FIG. 6, when the CRC detector 90 detects error (Yes) in the physical slot $T_{20}$ of the traffic channel (0) in the TDMA/TDD frame (2), the frequency offset in the physical slot $T_{30}$ of the traffic channel (0) in the TDMA/TDD frame (3) is corrected by use of the offset $E_{10}$ estimated in the physical slot $T_{10}$ of the traffic channel (0) in the TDMA/TDD frame (1).

Also, when the CRC detector 90 detects error (Yes) in the physical slot $T_{13}$ of the traffic channel (3) in the TDMA/TDD frame (1), the frequency offset in the physical slot $T_{23}$ of the traffic channel (3) in the TDMA/TDD frame (2) is corrected by use of the estimated offset $C_{32}$ which is the offset $E_{n3}$ estimated in the physical slot $T_{n3}$ of the traffic channel (3) in the TDMA/TDD frame (n).

As has been discussed above, by updating the estimated frequency offset with reference to the result of CRC calculation, it is possible to demodulate data only by use of reliable estimation results even when receiving a slot modulated by the modulation scheme which is different from that used on the personal station PS side. By this configuration, even when the modulation scheme is unexpectedly changed on the cell station CS side during communication between the cell station CS and the personal station PS, the data in the next frame can be accurately demodulated.

The instant alternative embodiment is directed to the case where the present invention is applied to the frequency offset estimator 42. However, the present invention is not limited thereto. Needless to say, the present invention can be applied to the symbol timing estimator 40.

The entire disclosure of Japanese patent application No. 2007-219755 filed on Aug. 27, 2007, including the specification, claims, accompanying drawings and abstract of the disclosure, is incorporated herein by reference in its entirety.

While the present invention has been described with reference to the particular illustrative embodiments, it is not to be restricted by the embodiments. It is to be appreciated that those skilled in the art can change or modify the embodiments without departing from the scope and spirit of the present invention.

What is claimed is:

1. An offset estimation device which estimates an offset of a signal received through digital communication and makes use of an estimated offset as correction information for offset correction, comprising:
   an estimator for estimating the correction information with respect to the received signal;
   a corrector operative in response to the correction information for correcting the offset of the received signal;
   a demodulator for demodulating the received signal of which the offset is corrected by said corrector; and
   a determiner for examining the received signal which is demodulated by said demodulator and evaluating a reliability of the demodulated signal to output a control signal indicating whether or not the demodulated signal is reliable,
   said estimator being operative in response to the control signal to update the correction information.

2. The device as claimed in claim 1, wherein said determiner examines the demodulated received signal by detecting a unique word in the demodulated received signal to produce the control signal in accordance with whether or not the unique word is detected.

3. The device as claimed in claim 1, wherein said determiner examines the demodulated received signal by performing CRC (Cyclic Redundancy Check) calculation of the demodulated received signal to produce the control signal in accordance with whether or not a result of the CRC calculation indicates error.

4. The device as claimed in claim 1, wherein said estimator comprises a first estimator circuit for estimating a frequency offset of the demodulated received signal to produce first correction information indicative of the frequency offset estimated.

5. The device as claimed in claim 4, wherein said estimator further comprises a second estimator circuit for estimating a symbol timing of the demodulated received signal to produce second correction information indicative of the symbol timing estimated.

6. The device as claimed in claim 5, wherein said corrector includes a first corrector circuit operative in response to the first correction information for correcting the frequency offset of the received signal.

7. The device as claimed in claim 6, wherein said corrector further includes a second corrector circuit operative in response to the second correction information for correcting timing of a symbol of the received signal.

8. A communication device operable on a basis of TDMA (Time Division Multiple Access), comprising:
   an antenna for receiving, as a high frequency analog signal, radio waves transmitted from a party under communication;
   a radio frequency module for amplifying the high frequency analog signal;
   an analog-to-digital converter for converting the high frequency analog signal amplified by said radio frequency module to a corresponding digital signal; and
   a demodulator for demodulating the digital signal to obtain information,
   said demodulator comprising:
   a frequency offset estimator operative in response to the digital signal for estimating a frequency offset of the digital signal with respect to a frequency in synchronization with which said demodulator performs demodulation;
   an estimated frequency offset storage for storing the frequency offset estimated by said frequency offset estimator;
   an offset corrector for correcting the digital signal with reference to the estimated frequency offset stored in said estimated frequency offset storage;
   a demodulator circuit for demodulating the digital signal, demodulation by said demodulator circuit overlapping estimation of said frequency offset estimator such that a physical slot of the TDMA is offset corrected with reference to the estimated frequency offset which is estimated in a preceding physical slot; and a verification circuit for verifying the digital signal demodulated by said demodulator circuit, and evaluating a reliability of the demodulated digital signal to output a verification signal indicating whether or not the demodulated digital signal is reliable, said estimated frequency offset storage being operative in response to the verification signal to update, when the verification signal indicates that the demodulated digital signal is reliable, the estimated frequency offset in said frequency offset estimator.

9. The device as claimed in claim 8, wherein said device is a mobile terminal serving as a personal station of a personal handy phone system communicating with a cell station on physical slots of control and traffic channels on the basis of TDMA/TDD (Time Division Multiple Access/Time Division Duplex).

10. The device as claimed in claim 9, wherein said offset corrector receives the estimated frequency offset from said estimated frequency offset storage when the digital signal is transmitted on a first physical slot of a traffic channel such that the offset of the digital signal is corrected with reference to the estimated frequency offset which is estimated in a second physical slot of the traffic channel temporally preceding the first physical slot, said offset corrector receiving the estimated frequency offset from said frequency offset estimator when the digital signal is transmitted on a third physical slot of the traffic channel such that the offset of the digital signal is corrected with reference to the estimated frequency offset which is estimated in the third physical slot of the traffic channel.

11. The device as claimed in claim 8, wherein said demodulator receives the digital signal from said analog-to-digital converter through a digital filter for passing desired frequency band data of the digital signal.

* * * * *